United States Patent [19]

Gelardi

[11] Patent Number: 5,435,449

[45] Date of Patent: Jul. 25, 1995

[54] RECORDING MEDIUM STORAGE CONTAINER

[75] Inventor: John A. Gelardi, Kennebunkport, Me.

[73] Assignee: Microplas, Inc., Clinton, Mass.

[21] Appl. No.: 133,831

[22] Filed: Oct. 12, 1993

[51] Int. Cl.⁶ .............................................. B65D 43/16
[52] U.S. Cl. ................................. 206/425; 206/308.3; 220/339
[58] Field of Search ............... 206/444, 320, 425, 307, 206/309; 220/337, 339

[56] References Cited

U.S. PATENT DOCUMENTS

| | | |
|---|---|---|
| D. 298,515 | 11/1988 | Pennel . |
| 1,120,872 | 12/1914 | Weis ................... 220/339 X |
| 1,998,881 | 4/1935 | McGovern . |
| 3,317,097 | 5/1967 | Giordano ............ 220/339 X |
| 3,933,296 | 1/1976 | Ruskin et al. ........ 220/339 X |
| 4,545,484 | 10/1985 | Rohner . |
| 4,546,898 | 10/1985 | Ekuan . |
| 4,598,824 | 7/1986 | Long et al. . |
| 4,696,397 | 10/1987 | Nakamats . |
| 4,735,309 | 4/1988 | Nemeth . |
| 4,759,443 | 7/1988 | Egly . |
| 4,762,225 | 8/1988 | Henkel . |
| 4,766,999 | 8/1988 | Kin-Shon . |
| 4,779,756 | 10/1988 | Buelens et al. .......... 220/339 X |
| 5,163,560 | 11/1992 | Parrish, Jr. et al. ........... 206/320 X |
| 5,183,202 | 2/1993 | Love . |

Primary Examiner—Jacob K. Ackun

Attorney, Agent, or Firm—James Creighton Wray

[57] ABSTRACT

A storage container for 3.5 inch diskettes is integrally molded in a single piece. A base has a bottom and front, back and opposite sides which extend upward from the bottom. Front and back living hinges are formed along upper edges of the front and back of the base. Rectangular half covers are formed on the living hinges. Edges of the cover halves abut when closed. Complementary inward facing recesses and outward facing recesses in abutting edges hold the edges in alignment when the covers are closed. Similar recesses are formed in the lower edges of the cover sides and in the upper edges of the base sides. A central semicircular extension along the upper edge of each side of the base engages quarter-circular recesses at corners of the cover sides to align the cover and base sides when closing, and to hold them in alignment. A latch with a downward extending tongue extends forward from a central edge of the top of one cover for engaging an upward opening groove near an edge of the center of the top of the other cover. A semicircular area on the top is reinforced and tapered toward the groove to hold the groove upward in engagement with the tongue, and to allow the semicircular area and groove to be pressed downward out of engagement with the tongue for opening the covers. The covers are folded outward and downward to prevent tipping of the base while rocking the relatively heavy diskettes forward or rearward within the base for reviewing labels on the diskettes and to select a diskette and while removing or inserting a diskette.

16 Claims, 4 Drawing Sheets

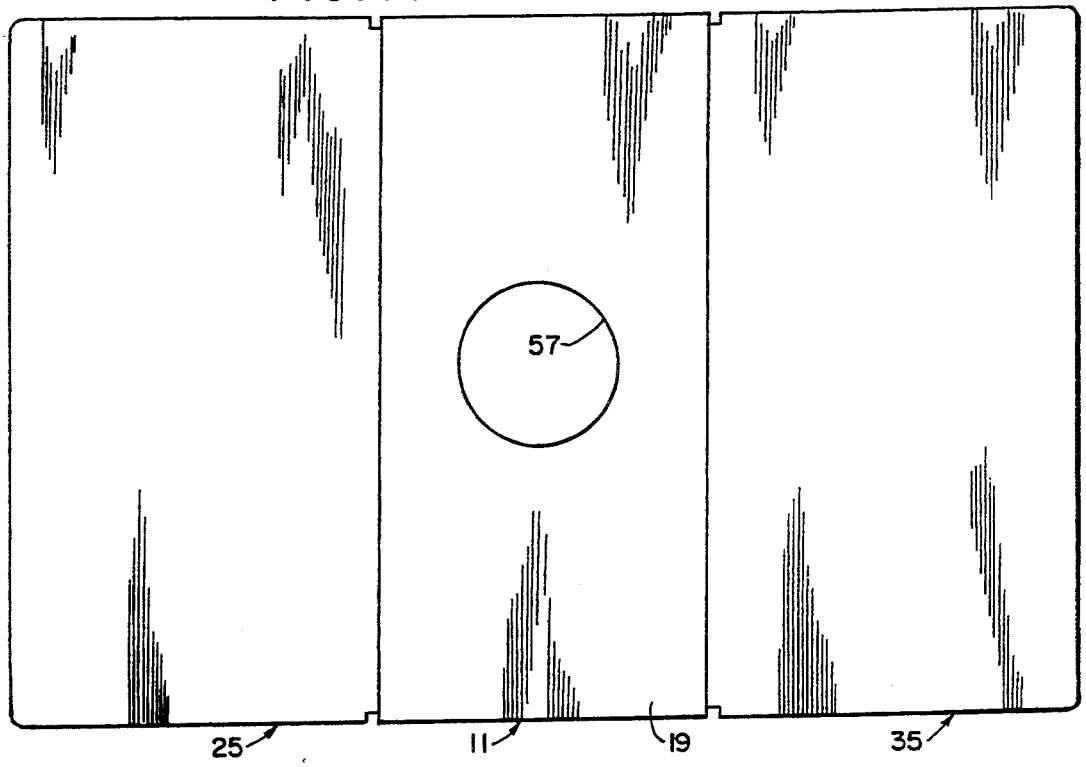
FIG. 10
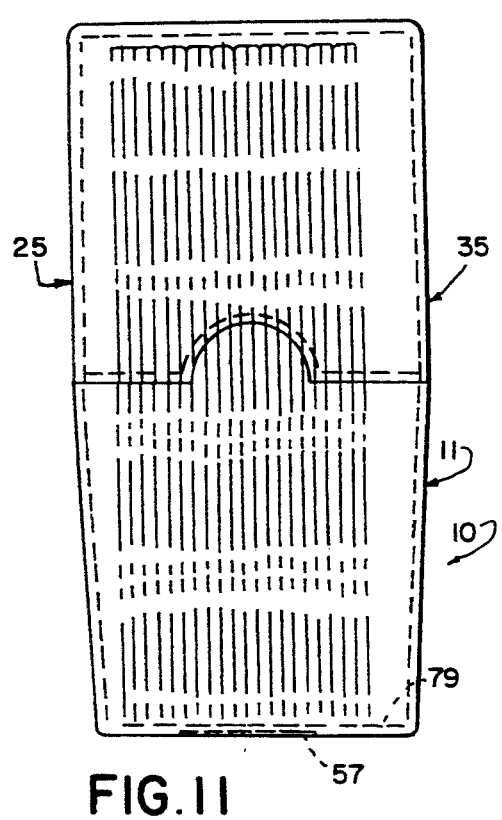
FIG. 11
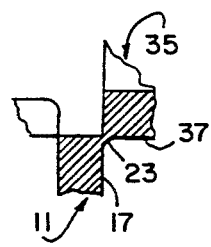
FIG. 12
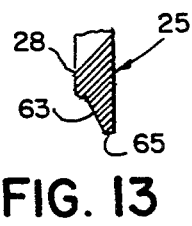
FIG. 13
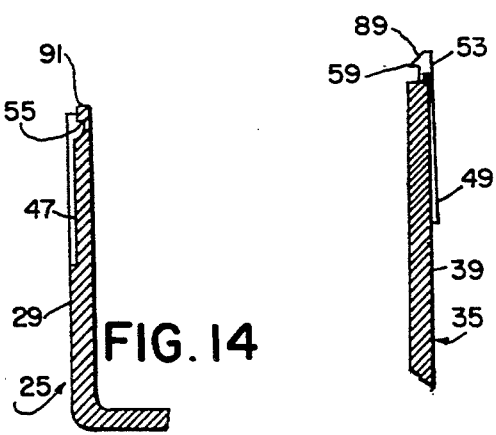
FIG. 14
FIG. 15

RECORDING MEDIUM STORAGE CONTAINER

BACKGROUND OF THE INVENTION

This invention concerns storage containers for recording medium such as optical or magnetic medium and primarily for 3.5 inch diskettes.

3.5 inch diskettes are widely used with computers. Often the diskettes are packaged and sold in two-part folded cardboard boxes containing ten diskettes. Often the cardboard boxes have upper and lower telescoping pats, which are held together with shrink wrap. The shrink wrap is removed and, unless the bottom of the box is intentionally and carefully held, the tendency is to grip the box by the cover. The diskettes being relatively heavy compared to the box, ten diskettes weighing about 8 ounces and a box weighing about 1.5 ounces and the boxes being relatively slippery, the bottom box slides out of the top cover and bounces on a desk or hits the floor, often spilling the diskettes.

When the diskettes are stored in the retail boxes by replacing the cover, the boxes tend to be lifted by gripping the cover, often with the result that the bottom slides out, with the possibility of tipping and releasing the diskettes.

The manufacturing operations are complex for the cardboard boxes, in which the telescoping halves must be due cut, folded and glued, and then telescopically assembled after filing and before shrink wrapping.

It has been suggested on some boxes that, after the cover is removed, the cover be inverted and the base be inserted in the cover to form a file box. However, the file box, if left in that condition, exposes the diskettes to dust, which is undesirable.

A need exists for a diskette storage container which is relatively inexpensive to manufacture and which is suitable for a retailer, and which is conveniently opened to expose the diskettes and is re-closed to protect the diskettes.

SUMMARY OF THE INVENTION

The present invention solves the problems of the diskette storage containers of the prior art.

The invention provides a diskette storage container which may be formed in a single step in a mold and which, after diskettes have been loaded, is easily closed in a retail and storage configuration, and which is convenient to use as a storage container for diskettes.

The storage container of the present invention has a bottom half which is integrally formed with upper quarters molded and pivoted on living hinges. The storage container may be opened with one hand by pressing downward at the center of a top half and releasing a latch to allow the covers to spring open. The diskettes may be accessed with the covers in the outward horizontal position, or the covers may be folded downward to further prevent tipping as the diskettes are moved and handled.

The storage container of the present invention, which can store up to ten diskettes or more, has a base with a back, a front, a bottom and sides. The front and back have lower fixed halves and upper movable halves connected to the lower halves by living hinges. The living hinges allow the upper front and back halves to rotate between open and closed positions. In one open position, the upper part of each side is aligned with the lower part. The two foldable walls made it extremely easy for the user to access the diskettes stored in the box and support the open box against tipping. The tops have complementary retainers for securing the storage box in a closed position.

The box has a wide and tall front and back and relatively barrow sides. A bottom half is rigid and is preformed with an upward opening. Top halves of the front and back are hinged to upper edges of the bottom halves with living hinges. Each top half has rigidly formed therewith one half of the top and upper sides. It may be said that the box has a bottom half and two upper front and back quarters. Semi-circular alignment discs are centrally connected to upper edges of the fixed sides to align and support the sides of the upper quarters when closing. Lower edges of the sides of the upper quarters fit outside the upper edges of the bottom half. A central elongated hook in one half of the top extends over a complementary groove in the other top half to hold the box closed. The bottom has four parallel ridges to align the contents above a raised gate recess in the floor of the box.

A preferred storage container for 3.5 inch diskettes is integrally molded in a single piece. A base has a bottom and front, back and opposite sides which extend upward from the bottom. Front and back living hinges are formed along upper edges of the front and back of the base. Rectangular half covers are formed on the living hinges. Edges of the cover halves abut and slightly overlap when closed. The edges have complementary inward facing grooves or recesses and outward facing grooves or recesses for holding the edges in alignment when the covers are closed. Similar complementary recesses are formed in the lower edges of the cover sides and in the upper edges of the base sides. A central semicircular extension along the upper edge of each base side engages quarter circle recesses at corners of the cover sides to align the cover and base sides when closing, and to hold them in alignment. A latch with a downward extending tongue extends from a central edge of the top of one cover for engaging an upward opening groove near an edge of the center of the top of the other cover. A semicircular area on the latter top is reinforced and is tapered toward the groove to hold the groove upward in engagement with the tongue, and to allow the semicircular area to be pressed downward to move the groove downward and out of engagement with the tongue for opening the covers. The covers are folded outward and downward to prevent tipping of the base while tilting the relatively heavy diskettes forward or rearward within the base to review labels on the diskettes and to select a diskette.

A preferred 3.5 inch diskette storage container apparatus has a generally rectangular box. A base has a bottom and integrally formed front, rear and opposite side walls extending upward from the bottom and joined together, and terminated upwardly and forming an open upper edge extending around the base. Upward extensions are integrally formed in centers of upper edges of the side walls. Upper edges of the side walls extend above upper edges of the front and back. Living hinges are joined to upper edges of the front and back. Front and back half covers are integrally formed with the front and back living hinges. The front cover has a front face with a lower edge of the front face connected to the front living hinge. A front top portion extends at right angles to the front face. First and second opposite sides extend perpendicularly along edges of the front face and of the front top portion and form open edges along a rearward edge of the front top portion and along rearward edges of the first and second opposite sides, and along lower edges of the first and second opposite sides. Lower edges of the first and second opposite sides of the front cover have complementary configurations for engaging upper extensions of the opposite sides of the base. A rear cover half has a rear surface with a lower edge of the rear surface joined to the rear living hinge, and a rear top portion joined at right angles to an upper edge of the rear sides integrally joined with the rear top and rear surface perpendicularly thereto. The rear top has an open forward edge, and the first and second rear sides have open forward edges for engaging rearward edges of the first and second sides of the front cover half. The first and second rear sides have lower edges for engaging portions of the upper edges of the sides of the base. The lower edges of the rear sides have complementary configurations for engaging the upward extensions on the base sides.

A first latch on a rearward edge of the front top half and a complementary second latch on the forward edge of the rear top engage and disengage for locking and opening the storage container.

The latches have a first central upward opening groove formed along one edge, and a central cantilever with a downward extending tongue for engaging the groove.

A semicircular area surrounds the groove for pressing the semicircular area and the groove downward to disengage the latch.

The upper extensions are semicircular discs integrally formed with the upper edges of the base. Quarter circular cutouts are formed at intersections of vertical and horizontal edges of the top sides for engaging the semicircular discs.

Outer facing recesses are formed along the lower edges of the sides of the upper halves. Complementary recesses are formed in inner surfaces along upper edges of the sides of the base for holding the lower edges of the sides of the upper half outward.

Outer facing recesses are formed along the lower edges of the sides of the upper halves. Complementary recesses are formed in inner surfaces along upper edges of the sides of the base for holding the lower edges of the sides of the upper half inward, and in the inner surfaces of the edges of the semicircular discs for holding edges of the top halves outward with the semicircular discs.

A preferred diskette storage container apparatus has a base with a bottom with integrally formed opposite long walls and opposite side walls extending upward therefrom in rectangular form. Upper edges and first and second living hinges are connected to upper edges of the long walls. First and second top halves are connected to the first and second living hinges. The top halves each have a long wall which is generally equivalent to a long wall of the base, and side walls which are approximately one half of the size of the side walls of the base. A top is about one half of the size of the bottom of the base. The upper halves are pivotable upwardly for abutting opposed edges of the tops and side walls for holding a number of diskettes in the storage container and for exposing upper halves of the diskettes from the base when the top halves are rotated downwardly on the living hinges.

Inward facing recesses are formed along lower edges of the upper side walls. Complementary outward facing recesses are formed along upper edges of the base side walls for interfitting the recesses and holding lower edges of the top side walls aligned with the upper edges of the base side walls.

The storage container has upward extensions in centers of upper edges of the base side walls, and outward facing grooves are formed in the edges of the upward extensions. Complementary recesses in intersecting edges of the top side walls and inward facing grooves along the recesses cooperate with the outward facing grooves on the extensions.

Cooperating grooves and extensions along complementary edges of the cover halves hold the side walls and tops in alignment.

A first latch on a rearward edge of the front top half and a complementary second latch on the forward edge of the rear top engage and disengage and lock and open the storage container.

These and further and other objects and features of the invention are apparent in the disclosure, which includes the above and ongoing written specification, with the claims and the drawings.

BRIEF DESCRIPTION OF THE DRAWINGS

FIG. 10 is a bottom view of an open box.

FIG. 11 shows ten diskettes stored in a box.

FIG. 12 is a cross-sectional detail of the living hinges joining the joints between top halves and bases.

FIG. 13 is a cross-sectional detail of a lower edge of a top half which fits outside the open upper side edges of the base.

FIG. 14 is a cross-sectional detail of a recessed latch on an edge of a top.

FIG. 15 is a cross-sectional detail of an extended latch on an edge of a top.

DETAILED DESCRIPTION OF THE DRAWINGS

Figures 1, 3:
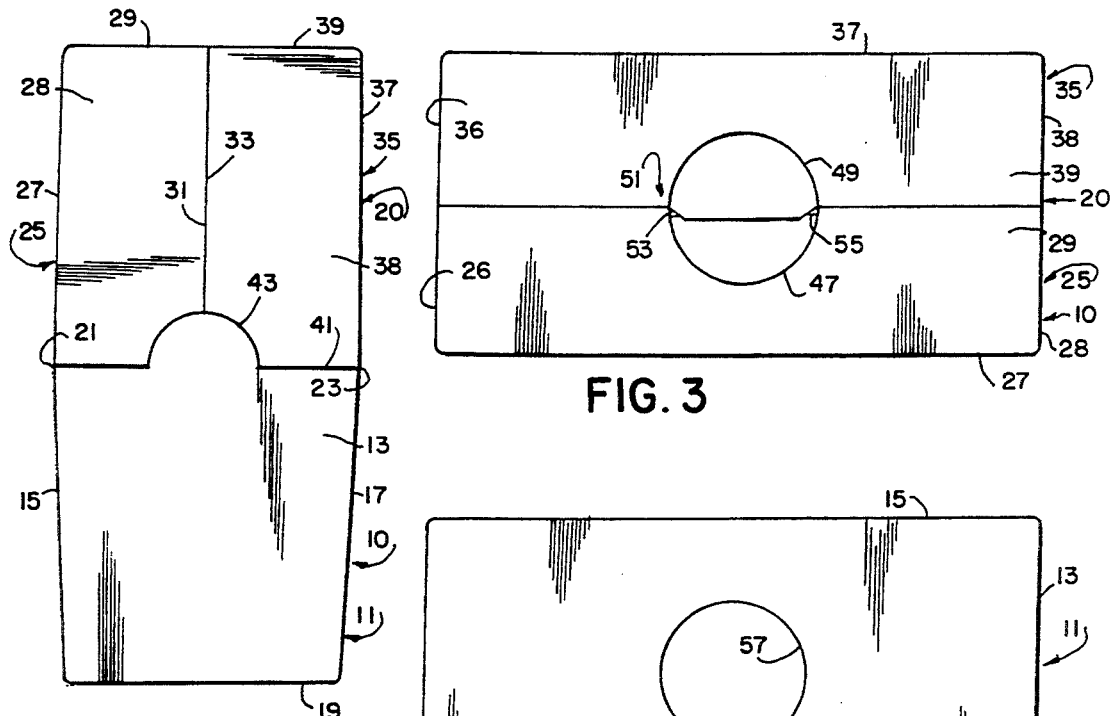
FIG. 1 is a side elevation of the closed box. The other side is substantially identical.
FIG. 3 is a top plan view of the closed box.

As shown in the side elevation of FIG. 1, the storage container has a base 11, a side 13, a front 15, a back 17 and a bottom 19.

Two upper half covers are generally indicated by the numeral 20. The covers 20 are joined to the top of the front and back by living hinges 21 and 23. Front cover 25 has a face 27, sides 28 and a top 29. Back cover 35 has a rear surface 37, opposite sides 38 and a top 39. The covers are joined at abutting edges 31 and 33, which slightly overlap. The upper edge 41 of the base 11 has a central upward semicircular extension 43. Lower edges of the covers 25 and 35 fit around and outside of the upper edges 41 and the upper extensions 43 on the upper edges of the base sides. Edges of the sides have complementary inward and outward facing recesses for smooth interfitting. Abutting edges of the sides and tops of the covers have similar complementary inward and outward recesses for interfitting the edges in smooth joints.

Figure 2:
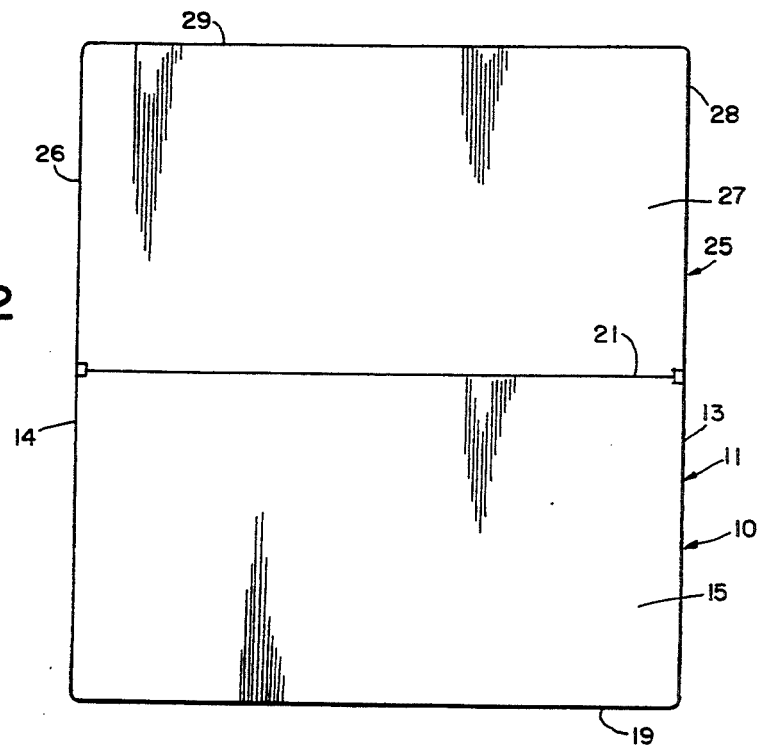
FIG. 2 is a front elevation of the closed box. The back is substantially identical.

FIG. 2 is a front view showing the front 15 of the base 11 of the storage container 10, and the front face 27 of the front cover 25. Living hinge 21 is shown joining the front 15 and the front face 27 of the cover. The opposite side wall of the base is indicated by the numeral 14, and the opposite side of the cover is indicated by the numeral 26.

FIG. 3 is a top plan of the storage container 10 showing the tops 29 and 39 of the covers which are joined by abutting edges 45. A circular reinforced area 47 at the center of the abutting edge 45 of the front top portion 29 is aligned with a similar circular area 49 on the rear top 39. The cover portions are joined by a latch 51, which includes an extension 53 on the rear top 39, and a downward projecting tongue which extends into upward opening groove 55 of the front top 29. Pushing downward on the semicircular portion 47 depresses groove 55, releases the latch 51 and allows the cover portions 25 and 35 to spring outward, rotating on the living hinges. The numeral 36 denotes the opposite side of top 35.

Figure 4:
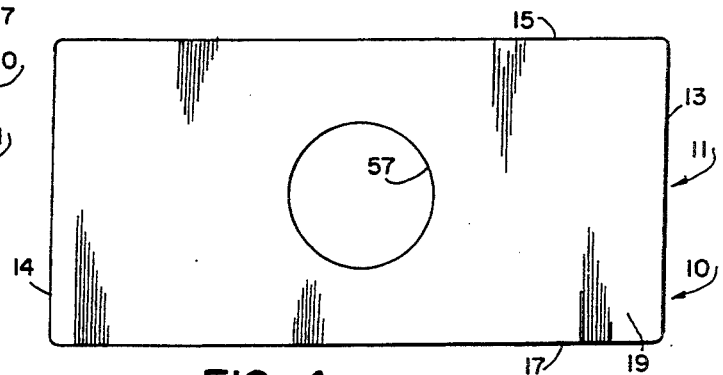
FIG. 4 is a bottom view of the closed box.

FIG. 4 is a bottom view of the closed storage box 10 showing the bottom 19 and a raised or inwardly recessed circular gate area 57.

The storage container shown in FIG. 1-4 is a compact container which is easily opened by pressing a semicircular area on one top with a finger, allowing the covers to spring open. The covers may be allowed to form a Y shape with the base while diskettes are inserted or removed, or the covers may rest in horizontal alignment as formed. The covers may be further urged downwardly so that the tops 29 and 39 are near the bottom 19.

To close the storage container, the thumb and the forefinger of one hand are moved upward along the front and back of the base from one side, pressing the covers together until their edges contact and the latches snap together.

Figure 5:
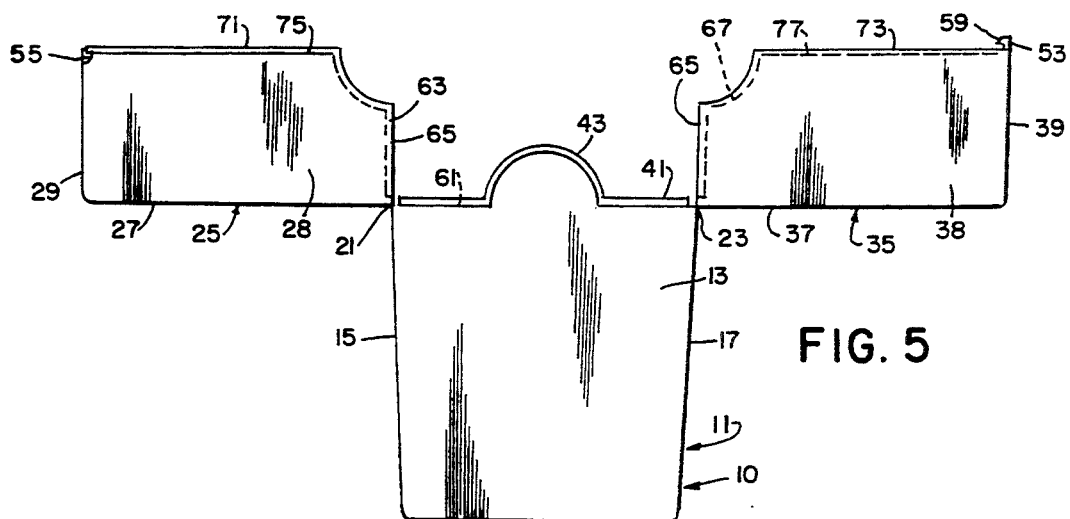
FIG. 5 is a side elevation of an open box.

FIG. 5 shows a right side view of the storage container in its molded, open position. The base has an open top, and the front cover 25 and rear cover 35 are molded on living hinges 21 and 23 respectively. The upper edge 41 of side 13 of the base, and the upward extension 43, have outward facing recesses 61 formed therein, which cooperate with recesses 63 along the lower edges 65 of the covers. The circular recesses 67 cooperate with the recess along the senicircular extension 43 so that the lower edges of the top sides 28 and 38 fit around and outside of the upper edge portions of the side 13 when the covers are closed. That stabilizes the box and prevents entrance of dust while the box is stored, and strengthens upper covers so they cannot move inward. Edges 71 and 73 on sides 28 and 38 of covers 25 and 35 have complementary recesses 75 and 77 to provide exact seating of the edges 71 and 73 of the covers. Similar complementary oppositely facing recesses are formed in abutting edges of the tops.

Latch extension 53 has an inward extending tongue 59, which cooperates with the groove 55 in the latch on top 29 to secure the covers together.

Figure 6:
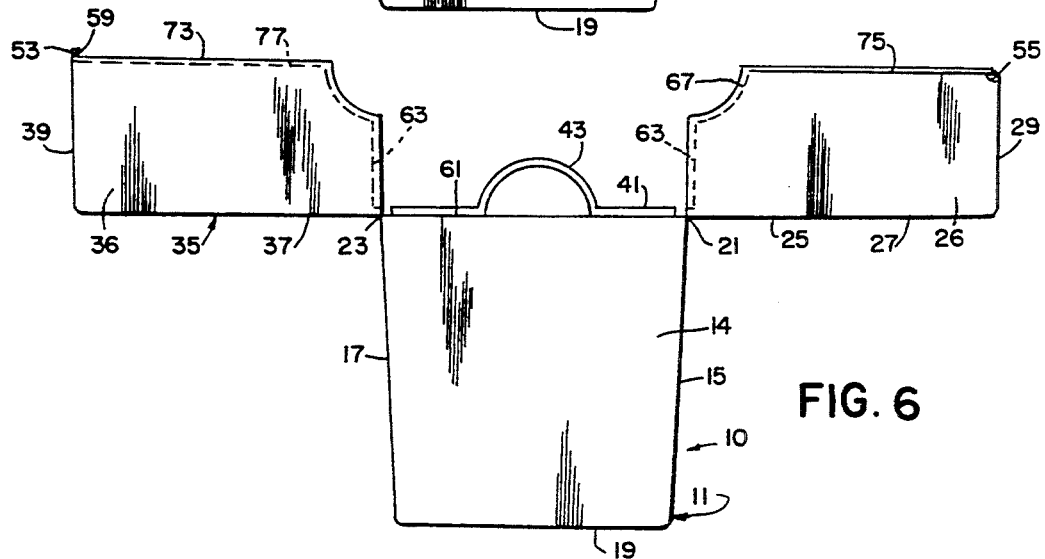
FIG. 6 is an opposite elevation of an open box.

FIG. 6 shows the open box from the opposite side, showing the similar upper edge 41 and upper extension 43 on side 14, and the similar recesses 61 and 63 and 75 and 77 along the mating edges.

Figure 7:
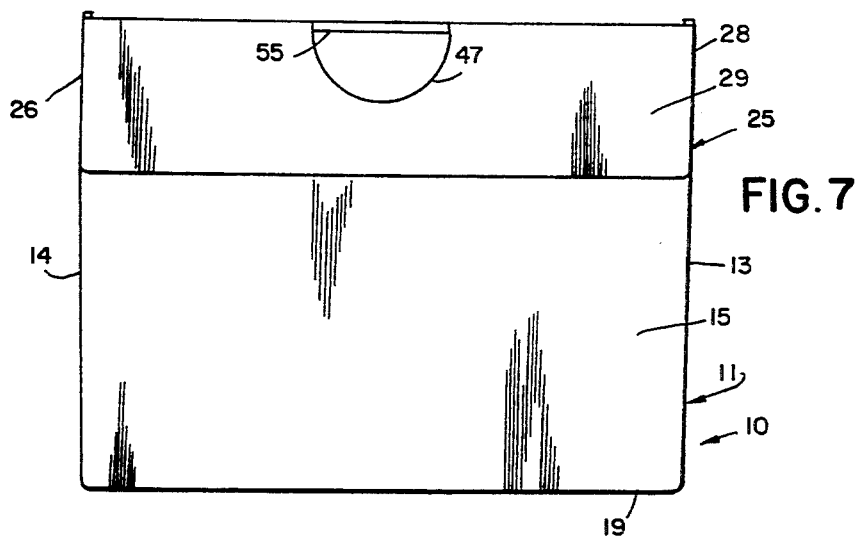
FIG. 7 is a front elevation of an open box.

FIG. 7 is a front view of the storage container 10 in the open and molded position showing the cover 25, the top 29 and the semicircular reinforced area 47 with the latching groove 55 extending across the semicircular area.

Figure 8:
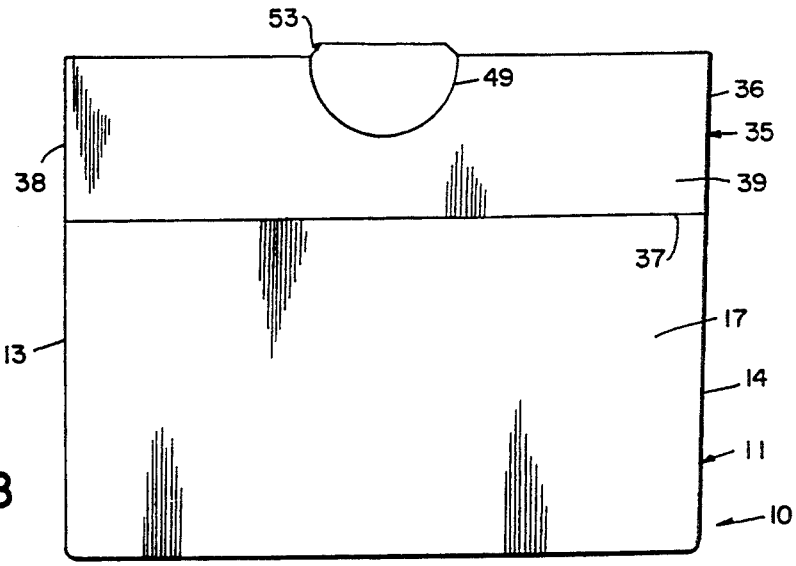
FIG. 8 is a rear elevation of an open box.

FIG. 8 shows the rear view of the open and molded position of the storage container 10, showing the back 17, the rear cover 35, the semicircular area 49 on the top 39 and the latching extension 53.

Figure 9:
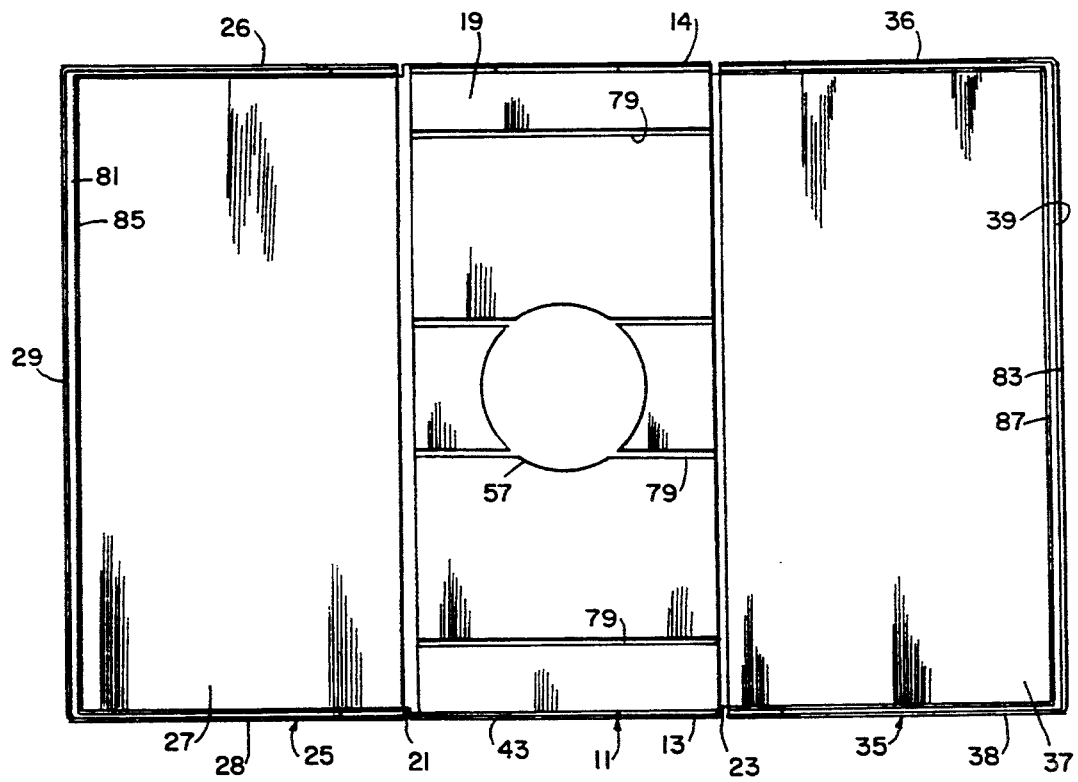
FIG. 9 is a top view of an open box.

FIG. 9 is a top view of the open and molded form of the storage container 10. The base 19 has a raised circular gate area 57 and ribs 79 which extend across the base parallel with the flat top of the gate area 57, and which support the bottoms of the aligned diskettes.

Edges 81 and 83 of the covers 25 and 35 have complementary oppositely facing recesses 85 and 87 for mating of the abutting edges of the tops 29 and 39.

FIG. 10 shows an open bottom view with gating recess 57 in the bottom 19.

As shown in FIG. 11, ten 3.5 inch diskettes numbered 1-10 and shown in phantom lines are stored in the storage container, which leaves room for literature and labels, which may be packed and shipped with the diskettes. The dashed hidden lines show the inner surfaces of the storage container 10.

FIG. 12 shows a living hinge 23 formed between a back 17 of the base 11 and a rear wall 37 of the cover 35.

FIG. 13 shows an enlarged detail of a mating recess 63 formed along an edge 65 of a side 28 of cover 25, as an example. Similar recesses are formed in all mating edges. The recess shown in FIG. 13 is an inward facing recess. Outward facing recesses have similar shapes.

FIG. 14 is an enlarged detail of the front cover 25 showing the recessed semicircular area 47, which is depressed to push the latching groove 55 downward and to release the latch.

FIG. 15 shows the top 39 of the cover 35, with the reinforced semicircular area 49 from which the projection 53 extends to carry the tongue 59 in a cantilevered position to engage latching groove 55.

The storage container is easily opened by pressing the area 47 with a finger to open the container. Running the finger and thumb upward from the base along face 27 and rear surface 37 of the covers presses the covers together and causes the latches to engage when the ramp 89 on the end of the projection 53 automatically lifts over the corner 91 of the latching groove 55. Once engaged, the covers will not come apart, and the container will not open until it is intentionally opened by pressing in the particular location on the top. When the container is opened, the tops may be urged downward so that they are parallel with the bottom 19 to give the container additional stability.

When the top are left in their outward positions, as shown in FIGS. 5-10, the tops catch the container if it is tipped and before it becomes completely horizontal, preventing spilling of the diskettes by the sliding of the slippery surface diskettes over each other.

While the invention has been described with reference to specific embodiments, modifications and variations of the invention may be constructed without departing from the scope of the invention, which is defined in the following claims.

I claim:

1. A 3.5 inch diskette storage container apparatus, comprising a generally rectangular box having a base with a bottom and integrally formed front, back and opposite side walls extending upward from the bottom and joined together, and terminated upwardly and forming open upper edges of the front, the back and the side walls extending around the base, upward extensions integrally formed in centers of upper edges of the side walls, and thereby extending centers of the upper edges of the side walls above upper edges of the front and the back, front and rear living hinges joined to the upper edges of the front and the back, and front and rear half covers integrally formed with the front and rear living hinges, the front half cover having a front face with a lower edge of the front face connected to the front living hinge, and a front top portion extending at right angles to the front face, and first and second opposite front sides extending generally perpendicularly along edges of the front face and the front top portion and forming open edges along a rearward edge of the front top portion, along rearward edges of the first and second front sides, and along bottom edges of the first and second front sides, the bottom edges of the first and second sides having complementary configurations for engaging the upward extensions on upper edges of the opposite sides of the base, the rear half cover having a rear face with a lower edge of the rear face joined to the rear living hinge, having rear opposite sides extending forward from the rear face and having a rear top portion joined at right angles to upper edges of the rear sides, which are integrally joined with the rear top and rear face generally perpendicularly thereto, the rear top portion having an open forward edge and the first and second rear sides having open forward edges for engaging rearward edges of the first and second front sides of the front half cover, and the first and second rear sides having lower edges for engaging portions of the upper edges of the sides of the base, the lower edges of the rear sides having complementary configurations for engaging the upward extensions on the upper edges of the sides of the base.

2. The apparatus of claim 1, further comprising a first latch on a rearward edge of the front top portion and a complementary second latch on a forward edge of the rear top portion for engaging and disengaging the latches and for locking and opening the storage container.

3. The apparatus of claim 2, wherein the latches comprise a first central upward opening groove formed along one edge of a top portion, and a central cantilever extending from the other top portion with a downward extending tongue for engaging the groove.

4. The apparatus of claim 3, further comprising a semicircular area surrounding the groove for pressing the semicircular area and the groove downward to disengage the latches.

5. The apparatus of claim 1, wherein the upward extensions are semicircular discs integrally formed with the upper edges of the base, and wherein the complementary configurations are quarter circular cutouts formed at intersections of vertical and horizontal edges of the front and rear sides for engaging the semicircular discs.

6. The apparatus of claim 5, wherein inward facing recesses are formed along lower edges of the front and rear sides of the half covers, and wherein complementary recesses are formed in outer surfaces along the upper edges of the sides of the base for holding the lower edges of the front and rear sides of the half covers outward.

7. The apparatus of claim 5, wherein inward facing recesses are formed along lower edges of the front and rear sides of the half covers, and wherein complementary recesses are formed in outer surfaces along the upper edges of the sides of the base for holding the lower edges of the front and rear sides of the half covers outward and the recesses formed along outer surfaces of the edges of the semicircular discs for holding edges of the half covers outward with the semicircular discs.

8. A diskette storage container apparatus, comprising a base having a base with a bottom with integrally formed opposite long walls and opposite base side walls extending upward from the bottom in rectangular form, and having upper edges, first and second living hinges connected to upper edges of the long walls, and first and second top halves connected to the first and second living hinges, the top halves each having a long wall which is generally equivalent to a long wall of the base, and upper side walls which are approximately one half of a size of the side walls of the base, and a top which is about one half of the size of the bottom of the base, the top halves being pivotable upwardly for abutting opposed edges of the tops and the upper side walls for holding a number of diskettes in the storage container and for exposing upper halves of the diskettes from the base when the top halves are rotated downwardly on the living hinges.

9. The apparatus of claim 8, further comprising inward facing recesses formed along lower edges of the upper side walls, and complementary outward facing recesses formed along upper edges of the base side walls for interfitting the recesses and holding lower edges of the upper side walls aligned with upper edges of the base side walls.

10. The apparatus of claim 9, further comprising upward extensions in centers of upper edges of the base side walls, and outward facing grooves being formed in edges of the upward extensions, and complementary recesses in intersecting edges of the upper side walls and inward facing grooves along the recesses for cooperating with the outward facing grooves on the extensions.

11. The apparatus of claim 8, further comprising cooperating grooves and extensions along complementary edges of the top halves for holding the upper side walls and the tops in alignment.

12. The apparatus of claim 8, further comprising a first latch on a rearward edge of the front top and a complementary second latch on a forward edge of the rear top for engaging and disengaging the latches and for locking and opening the storage container.

13. The apparatus of claim 12, wherein the latches comprise a first central upward opening groove formed along one edge of a top, and a central cantilever extending from the other top with a downward extending tongue for engaging the groove.

14. The apparatus of claim 13, further comprising a semicircular area surrounding the groove for pressing the semicircular area and the groove downward to disengage the latches.

15. A storage container for 3.5 inch diskettes integrally molded in a single piece, comprising a base having a bottom, a front, a back and opposite base sides which extend upward from the bottom, front and back living hinges formed along upper edges of the front and the back of the base, rectangular half covers having tops, cover sides, a cover front and a cover back formed on the respective living hinges, edges of the half covers abutting when closed, complementary inward facing recesses and outward facing recesses in abutting edges for holding the abutting edges in alignment when the half covers are closed, similar recesses formed in lower edges of the cover sides and in upper edges of the base sides, central semicircular extensions formed along upper edges of the base sides and complementary quarter-circular recesses formed at corners of the cover sides for aligning and holding the cover sides and the base sides when closing, a latch with a downward extending tongue extending forward from a central edge of the top of one half cover, an upward opening groove near an edge of the center of the top of the other half cover, a semicircular area on the latter top being reinforced and tapered toward the groove for holding the groove upward in engagement with the tongue, and for allowing the semicircular area and the groove to be pressed downward out of engagement with the tongue for opening the half covers, the covers being folded outward and downward for preventing tipping of the base while rocking relatively heavy diskettes forward or rearward within the base for reviewing labels on the diskettes and for selecting a diskette and for removing or inserting a diskette.

16. The container of claim 15, wherein the front and the back of the base slope outwardly and upwardly from the bottom and wherein the base side walls are larger along upper edges than along junctions of the base side walls with the bottom.

* * * * *